United States Patent [19]

Firsich

[11] Patent Number: 5,993,996
[45] Date of Patent: Nov. 30, 1999

[54] CARBON SUPERCAPACITOR ELECTRODE MATERIALS

[75] Inventor: David W. Firsich, Dayton, Ohio

[73] Assignee: Inorganic Specialists, Inc., Miamisburg, Ohio

[21] Appl. No.: 08/931,466

[22] Filed: Sep. 16, 1997

[51] Int. Cl.⁶ .................................................. H01M 4/58
[52] U.S. Cl. ......................................................... 429/231.8
[58] Field of Search .............................. 429/218, 231.8, 429/231.4; 423/449.2, 449.3

[56] References Cited

U.S. PATENT DOCUMENTS

| | | | |
|---|---|---|---|
| 4,327,400 | 4/1982 | Muranaka et al. | 361/433 |
| 4,597,028 | 6/1986 | Yoshida et al. | 361/305 |
| 4,633,372 | 12/1986 | Calahan et al. | 361/433 |
| 4,775,655 | 10/1988 | Edwards et al. | 502/416 |
| 4,806,290 | 2/1989 | Hopper et al. | 264/28 |
| 4,832,881 | 5/1989 | Arnold, Jr. et al. | 264/29.7 |
| 5,021,462 | 6/1991 | Elmes et al. | 521/63 |
| 5,150,283 | 9/1992 | Yoshida et al. | 361/502 |
| 5,208,003 | 5/1993 | Simandl et al. | 423/445 |
| 5,260,855 | 11/1993 | Kaschmitter et al. | 361/502 |

FOREIGN PATENT DOCUMENTS

| 58-222157 | 12/1983 | Japan | 423/449.3 |
|---|---|---|---|

OTHER PUBLICATIONS

"*Chemically Modified Carbon Fibers and Their Applications*", I.N. Ermolenko, et al., pp. 157–158, 257–259, 272 no date.

Primary Examiner—Steven P. Griffin
Assistant Examiner—Stuart L. Hendrickson
Attorney, Agent, or Firm—Thompson Hine & Flory LLP

[57] ABSTRACT

A carbon material useful as an electrode in supercapacitors and a method for preparing the same. In one method, a phenolic resin powder, optionally combined with a carbon powder, is formed into a layer less than 0.01 inches thick; the temperature of the resin is increased at a rate of approximately 0.1 to 4° C. per minute, thereby melting the resin into a porous network; the network is carbonized, hydrogenated in a hydrogen atmosphere and sulfonated.

20 Claims, 2 Drawing Sheets

CARBON SUPERCAPACITOR ELECTRODE MATERIALS

BACKGROUND

This invention pertains generally to energy storage devices, particularly high specific power and high energy density electrochemical capacitors known as supercapacitors, and specifically to a method of making active materials or electrodes for the same. There is a need for a rechargeable energy source that can provide high power, can be recharged quickly, has a high cycle life and is environmetally benign for a myriad of applications including defense, consumer goods, and electric vehicles. Double layer capacitors are rechargeable charge storage devices that fufill this need.

A single-cell double layer capacitor consists of two electrodes which store charge (these are called the "active" materials), separated by a permeable membrane which permits ionic but not electronic conductivity. Each electrode is also in contact with a current collector which provides an electrical path to the external environment. The electrodes and the membrane are infused with an electrolyte, and the entire assembly is contained in inert packaging. Multiple cells may be connected in series or in parallel in the final packaged unit.

Applying an electric potential across the electrodes causes charge to build up in the double layer which exists at the electrode/electrolyte interface of each electrode. This process can continue until a condition of equilibrium has been reached, i.e., the current drops to zero. The capacitance, or amount of charge that a capacitor can store, is directly related to the surface area of the electrodes. Therefore, electrodes made from conductive materials that possess high surface area (>100 $m^2/g$) are desirable. By employing various materials and fabrication means, capacitors have been developed which are capable of delivering very high specific power and energy densities.

Because carbon is chemically inert, has a high electronic conductivity, is environmentally benign and is relatively inexpensive, it is a desirable material for fabricating electrodes for supercapacitors. High surface area carbon powders are presently preferred for use in fabricating supercapacitor electrodes. The internal resistance of carbon powder electrodes is dependent upon the extent and quality of particle-to-particle contact. As the quality and extent of these contacts decreases, the internal resistance of the electrode increases, which in turn reduces the usable stored charge in the capacitor. In some applications the electrodes are maintained under high compression in an attempt to make them more conductive. Binders are often used to fabricate freestanding electrodes from carbon powders. However, the binders, generally being of a higher resistance than the carbon particles they surround, may increase the particle-to-particle resistance thereby degrading the performance of the electrodes.

In addition to methods well known in the art for fabricating high surface area carbon electrodes such as employing a binder, the use of carbon paste electrodes, or high pressure, other methods of fabricating these electrodes to improve their conductivity have been developed. U.S. Pat. Nos. 5,150,283 and 4,327,400 disclose electrodes composed of electrically conducting substrates into which or upon which carbon powder in various forms is impressed. A method of fabricating electrodes which have high specific surface area is disclosed in U.S. Pat. No. 4,597,028. Here activated carbon fibers are woven into a fabric which is used to fabricate electrodes. Compounds which improve the conductivity of carbon powder electrodes have been also employed as disclosed in U.S. Pat. No. 4,633,372. These methods suffer from the disadvantage that they require additional fabrication steps which may be expensive and complex. It has been recognized that one way to overcome the problems associated with carbon powder electrodes is to develop carbon in the form of a continuous, monolithic structure and prepared in such a way as to possess the desirable properties of high surface area and low electrical resistance. As illustrated in U.S. Pat. Nos. 5,260,855; 5,021,462; 5,208,003; 4,832,881; 4,806,290; and 4,775,655, carbon foams, aerogels and microcellular carbons have been developed which are useful as electrode materials in high energy capacitor applications, because they possess high surface area, low electrical resistance and adequate mechanical strength. While these materials represent an improvement over conventional carbon powder electrodes for supercapacitors, they have several disadvantages. Methods used to prepare carbon foams, aerogels and microcellular carbons require elaborate processing steps to prepare the precursor materials; among other things, the solvents must be completely removed from the precursor prior to the carbonization step. In order not to disrupt the microstructure of the polymer precursor, the solvent removal step must be done under carefully controlled conditions, using, for example, freeze drying or supercritical extraction. Furthermore, the solvents must either be disposed of or purified prior to reuse. In contrast to these earlier approaches, the method disclosed in the present invention requires no elaborate processing and no solvents.

Some of the earlier art requires a post-carbonization step known as activation to produce a carbon with a high surface area (>100 $m^2/g$). The activation treatment generally involves exposing carbon to an oxidant which may be a gas or an oxidizing chemical. Activation is a disadvantage in that it constitutes an extra processing step, and in addition, it is a difficult process to do reproducibly—small amounts of impurities such as alkalai metals cause variations in the surface area obtained, and furthermore the activating agent can preferably react at the surface of a porous carbon, resulting in inhomogeneity. In contrast to this prior art, the method disclosed in the present invention produces a high surface area monolithic carbon in a process that requires no activation.

SUMMARY OF THE INVENTION

It is an object of this invention to provide a method for preparing carbon materials useful as electrodes in supercapacitors that have:

1) a continuous, porous structure whose density may be adjusted (e.g., through particle size selection and pressure);
2) a surface area of over 500 $m^2/g$;
3) high electrical conductivity (e.g., about 25 siemens/cm);
4) high charge storage characteristics (e.g., in excess orf 100 Farads per gram and preferably in excess of 200 Farads per gram);
5) sufficient mechanical strength such that robust thin samples can be prepared;
6) the ability to be fabricated to near-net-shape; and
7) the ability to be fabricated from either a pressed powder compact, an extruded powder compact, or a porous polymer sheet produced by powder spray-coating.

One manifestation of the present invention is a method for producing a mechanically strong and conductive porous carbon network from polymer powder (or polymer powder/carbon powder blends) by first heating it in such a way as to fuse the particles into a porous monolith, and then heating to a higher temperature to carbonize the monolith. Preferably a polymer and carbonization temperature are used which together yield a high surface area carbon without the need for an "activation" step.

Another manifestation of the invention is a surface treatment for carbon products made by the foregoing processes and from other sources which includes sulfonation and preferably sulfonation preceded by hydrogenation. This treatment enhances the carbon's performance as a supercapacitor material, and in the broadest sense of the invention, it is a treatment which will enhance the performance of any carbon supercapacitor material, regardless of whether it exists as a porous monolith, powder, fiber, cloth, film, or in some other form. While this treatment is specifically illustrated for a porous monolith and for carbon powder, other carbon forms can also be sulfonated by the processes described herein.

DETAILED DESCRIPTION OF THE INVENTION

Figure 1:
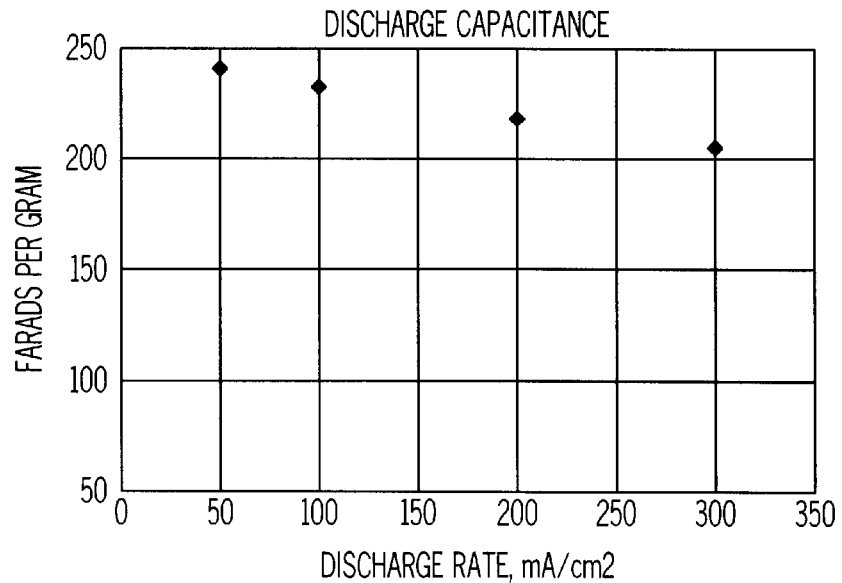
FIG. 1 is a graph of discharge capacitance versus discharge rate for a carbon electrode in accordance with the invention.

The method of preparing improved carbon electrodes disclosed in the present invention consists of the controlled pyrolysis of a pressed or spray-formed shape of a phenolic resin powder (phenolic resin compact), with pyrolysis consisting of a single carbonization procedure in an inert atmosphere. The procedure consists of two sequential heating ramps: The first rises and holds at a relatively low temperature, and the second rises more quickly to the ultimate carbonization temperature. The rate of the first ramp is chosen with the knowledge that there are two ways this polymer can behave when heated—if it is heated quickly it will simply melt; if it is heated very slowly it will cross-link and harden. However, if it is heated at a properly chosen rate, it will slightly melt (enough to cement the individual particles together) while also hardening and setting the structure, resulting in a porous network structure which is retained during carbonization at higher temperatures. Thus the parameters herein, applied to the phenolic resin polymer Varcum 29-407, balance the melting/hardening tendencies to allow a porous fused polymer network to form, and this porous polymer network carbonizes to form an isomorphic porous carbon network. Other phenolic resins which are available in a dry powdered form can also be used. Powdered resole resins are preferred.

During carbonization the phenolic compact generally shrinks uniformly without cracks or deformation. In addition to the fact that binderless electrodes with high conductivity may be made through this process, the "near-net-shape" carbonization property of the present invention represents a significant advantage over other methods of preparing continuous carbon structures, vide supra, in that the machining necessary to prepare electrode structures associated with other methods is eliminated or greatly minimized. Furthermore, the present invention offers the additional advantage that a carbon monolith having a continuous, porous, high surface area structure can be fabricated from an inexpensive precursor that need only be simply pressed and fired. A phenolic resin/carbon powder blend may be pressed, sprayed, or extruded into samples that shrink uniformly upon carbonization, providing a low-cost and flexible manufacturing process for carbon supercapacitor electrodes without the need for extensive machining. Pressed powder compacts as thin as 15 mils and as thick as one inch have been processed with this procedure.

While one method of preparing the precursor material for carbon electrodes for supercapacitors presses a phenolic powder mixture (optionally containing carbon powder) into a compact, another method is to spray-coat the powder blend to form a porous continuous sheet of a desired thickness. The electrostatic spray-coating of polymers is well-known in the art; the process is ordinarily used to provide a dense and impermeable polymer coating; this is achieved by heating the electrostatically sprayed polymer until it melts/flows into a dense and non-porous phase. However, for the purpose of making precursors for carbon supercapacitors, the process conditions are modified such that the polymer particles in the sprayed layer melt only slightly, bonding with adjoining particles and creating a sheet of a porous and continuous polymer network. The phenolic sheet may be either cut into pieces or left as an integral structure for further processing. Subsequent processing is set forth above, a controlled carbonization in an inert atmosphere. Note that other forming methods, such as flame-spraying, plasma-spraying, extrusion, or high velocity oxygen fuel spraying might also be used.

It will be obvious to those skilled in the art that this invention constitutes more than a carbonizable binder for powdered carbon. The polymer in a carbonizable binder only serves the function of bonding the carbon particles together; such a system would typically consist of a blend of a small amount of polymer binder (<10%) and a large amount of carbon powder. By contrast, in accordance with one manifestation of the present invention, porous carbon monoliths can be prepared using large percentages of polymer and small amounts of carbon. For example, porous carbon monoliths can be prepared from compositions containing approximately 40 to 100% polymer and 0 to 60% carbon powder. It is the surface area and the pore size distribution properties of the carbonized polymer which are principally responsible for the monolith's high performance as a supercapacitor electrode. The surface area should be greater than 500 $m^2/g$ and preferably greater than 750 $m^2/g$, and the pore size distribution should be optimized for mesoporosity (i.e., pores 20–100 Angstroms in diameter).

The discharge rate of a carbon supercapacitor increases as the electrode thickness decreases. Therefore, it is advantageous to make thin carbon electrodes. The electrodes used in conventional supercapacitors are about 0.015 inches thick. The method of the present invention can be used to produce carbon electrodes as thin as 0.010 inches without machining. Furthermore, these carbons are robust enough that they may be made even thinner by processes known in the art, such as sanding. By using spray-coating to form the phenolic resin precursor, it is possible to prepare carbon foam sheets no more than 0.003 inches thick.

After carbonization, a nitric acid treatment of the carbon is sometimes desirable. This procedure is empirically found to produce improved supercapacitor performance in many cases, and the beneficial effect is believed to have two sources: 1) Nitric acid digests uncarbonized fragments and dangling organic chains near pore openings, which block access to carbon pores. 2) Nitric acid oxidizes surface functional groups on the carbon, increasing the surface wettability so that more of its surface area is utilized during supercapacitor charge/discharge.

Those skilled in the supercapacitor art are familiar with the concept of pseudocapacitance. Pseudocapacitance is a reversible electrochemical reaction that can store charge. It is distinguished from the electrochemical reactions within conventional batteries in that it is a very fast reaction that occurs at or near the surface of an electrode, simulating capacitive behavior. As an example of this phenomenon, it is well known to those skilled in the art that quinone groups on the edges of graphite planes can undergo a reversible electrochemical reaction—this is a source of additional charge storage above and beyond that due to the double-layer phenomenon. Thus the supercapacitor charge storage can be increased by treating carbon electrodes to place quinone groups on the surface of the carbon.

The process disclosed herein utilizes a unique and advantageous surface treatment to improve storage capacitance. While not desiring to be bound, it is believed this capacitance arises from the placement of sulfonic acid groups on the edges of graphite planes. Sulfonation of the carbon is believed to enhance charge storage through pseudocapacitance; the pseudocapacitive reaction is the reversible electrochemical conversion of a sulfonic acid group to a sulfenic acid group. This reaction has particular advantages in that a) it occurs at a voltage in the middle of the useful range for aqueous systems, so that sulfonated carbon anodes and cathodes charge to a roughly equal degree when they are worked against one another. b) sulfonation of any carbon or any other organic material is known to enhance proton transport, facilitating fast electrochemical reactions (and thus fast discharge in a charge storage device).

Our experiments have shown that direct reaction with concentrated sulfuric acid or fuming sulfuric acid produces modest improvements in the performance of carbon supercapacitor materials; however, substantial improvements are observed if the carbon is first hydrogenated and then sulfonated with sulfuric acid treatment. This two-step approach to sulfonation (hydrogenation followed by sulfonation) is an important part of the new art disclosed herein. Hydrogenation is believed to convert oxygen-containing functional groups on the carbon edge-planes to hydrogens, facilitating the subsequent substitution of sulfonic acid groups at these atomic sites.

While the ability to fabricate monolithic structures is a key advantage of this technology, there can be cases where supercapacitor carbon is useful in other forms such as powder form. The supercapacitor carbon described herein may be produced in powder form by processing the starting material as a loose powder instead of a pressed powder compact, using slightly altered processing conditions. Subsequent process steps (carbonization, optional but highly preferred hydrogenation, and sulfonation) remain the same. The process disclosed herein combines the advantages of near-net-shape processing, a low cost precursor to provide a carbon structure with the preferred properties of high surface area, high porosity, high conductivity, a continuous structure, a surface treatment to enhance charge storage, and robust mechanical properties.

The objects of the present invention together with additional objects, novel features and advantages thereof over existing prior art forms, which will become apparent to those skilled in the art from detailed disclosure of the present invention as set forth hereinbelow, are accomplished by the improvements herein described and claimed.

DETAILED DESCRIPTION OF THE INVENTION

Described next is a method of fabricating monolithic carbon electrodes that employs an inexpensive starting material, a phenolic resin/carbon powder blend, to provide a product that possesses a uniform porous structure, good electrical conductivity, robust mechanical properties, a high surface area (at least 500 $m^2/g$), and may be produced to near-net-shape. These carbon electrodes are desirable for use in supercapacitors.

The preparative process comprises the following steps:
1) Providing a phenolic resin (Varcum 29-407) powder optionally containing a high surface area carbon powder. The particle size of each component may be about 1–100 microns, with the preferred range being 1–35 microns. The powder blend may contain about 30–95% phenolic resin by weight, with the balance carbon, but preferably with 80% phenolic resin.
2) Pressing or extruding the powder mixture into a compact at a pressure determined by the desired density of the final structure, but preferably about 100 to 600 $lbs/cm^2$.
3) Setting the porous network structure of the compact by melting at a rate that causes the particles to melt and stick together to form a porous network but not melt into a continuous nonporous film.
4) Carbonizing the compact by preferably heating temperatures of about 700 to 1000° C., but more preferably 800 to 850° C., either in vacuum, or preferably, under an inert atmosphere.
5) Hydrogenating the carbon at temperatures greater than about 650° C. and up to about 900° C., preferably in a pure hydrogen atmosphere, although a mixture of hydrogen and inert gas may be used.
6) Sulfonating the carbon from step 5, preferably using fuming sulfuric acid, although concentrated sulfuric acid, $SO_3$, or chlorosulfonic acid may be used.

The phenolic resin compacts of the present invention are produced by methods known in the art, namely; filling a die cavity with phenolic resin powder, the die cavity having the shape desired in the final carbon product, and applying sufficient hydraulic pressure, typically about 100 to 600 $lbs/cm^2$ to the die set to produce a uniform, freestanding shape. Because phenolic resin shrinks uniformly from about 25 to 50% during the carbonization step, the die cavity must be oversized accordingly.

The phenolic resin shape is carbonized after it is removed from the die, the preferable process being to place the compacted powder on a smooth carbon sheet and heat at a rate of about 0.1 to 4° C./min, more preferably 0.1° C./min, to a temperature of about 80 to 160° C., more preferably 140° C., and holding at the maximum temperature for 1 to 6 hours, more preferably 5 hours. This is immediately followed by a ramp of about 0.1 to 2°/min, more preferably about 0.4°/min, to a temperature of about 700 to 1000° C., more preferably 800 to 850° C., holding at the maximum temperature for about 0.5 to 5 hours, more preferably about 2 hours. This carbonization procedure is preferably done in a nitrogen atmosphere, although any inert gas or vacuum may be used.

An alternative way of forming the phenolic compact constitutes spray-coating of the powdered phenolic resin into a sheet. Spray-coating is ideal for creating uniform thin films in the 1–20 mil thickness range; this is the range of electrode thickness which is generally desirable for supercapacitors. As stated above, thin supercapacitor electrodes are advantageous because they lead to high discharge power. Spray-coating may be performed in such a way as to produce a porous polymer film. This film may be sprayed onto a removeable backing, later removing the backing and carbonizing the freestanding polymer film. Alternatively, the powder may be sprayed onto a solid plate such as graphite, and subsequent carbonization may be performed without removing the film from the plate, i.e., the entire plate may be placed into the carbonization furnace. In this case the film will release from the plate during the carbonization process.

According to this invention, in order to prepare carbon electrodes with high-performance supercapacitor characteristics, it is desirable to sulfonate the carbon in a two-step process after the carbonization step. Without sulfonation, the phenolic-based carbon exhibits 120–180 Farads per gram; after the two-step sulfonation process, the same material shows 200–260 Farads per gram. Note that simply sulfonating the carbon without the prior hydrogenation step gives about one-half of this improvement (e.g., 160–220 Farads per gram). Furthermore, in this case the improvement diminshes as the material is tested using increasing charge/discharge rates. The two-step process disclosed herein not only gives higher capacitances, in addition, this capacitance is largely retained as one charges/discharges the carbon at increasing rates. This effect is believed to be due to a high concentration of sulfonate groups on the carbon, which produces enhanced rates of proton transport in the electrolyte near the carbon surface. This phenomenon has precedent in that a high degree of sulfonation is known to enhance proton transport in sulfonated polymeric membranes immersed in aqueous media. Fast proton transport facilitates fast electrochemical charge/discharge reactions at the supercapacitor surface, and in turn these fast charge/discharge characteristics make the carbon a high power charge storage medium. High power is an important attribute of a supercapacitor.

Hydrogenation is typically performed by heating the carbon in an atmosphere of preferably pure hydrogen, although mixtures of hydrogen and inert gases may be used, heating to a temperature above about 650° C. (but preferably at least 50 degrees below the carbonization temperature) at a rate of about 1 to 5° C./min, more preferably at about 1° C./min. The ramp rate in this step is not critical, as the hydrogenation reaction only occurs at elevated temperatures; the main consideration is to not thermally shock the material. The hold time at maximum temperature will depend on the amount of carbon present and the flow rate of hydrogen into the furnace; a larger amount of carbon will require more hydrogen to pass over it to obtain a complete reaction. A final temperature above 650° C. is desirable to obtain a fast and extensive reaction with hydrogen; note however that restricting the temperature to a value below the carbonization temperature prevents the carbon from becoming further graphitized (thus reducing its surface area) during the hydrogenation process. A reduced surface area would detract from the carbon's supercapacitor performance.

Sulfonation preferably comprises heating the hydrogenated carbon in fuming sulfuric acid (15–30% $SO_3$) at about 110 to 150° C. for 24 hours. It has been found that heating for a longer period does not improve the results. Alternative procedures include heating the carbon in either concentrated or fuming sulfuric acid at temperatures that range from room temperature to 290° C. for periods of 1 hour to four days.

The following examples are given to illustrate embodiments of this invention.

EXAMPLE 1

In one embodiment of the preferred process, four grams of a powder which is a blend of powdered phenolic resin (80%) and powdered high-surface-area carbon (20%) is pressed into a disk, using a pressure of approximately 250 lbs/cm$^2$. The powdered phenolic resin is Varcum 29-407, made by Occidental Chemical. The pressed disk is carbonized in nitrogen using a two-step heat cycle: 0.1° C./min to 140° C., hold 5 hours; 0.4° C./min to 832° C., hold 2 hours. After cooling to room temperature, the disk is removed from the furnace and sawed into 10 mil thick wafer using a microtome. The wafers are heated in concentrated nitric acid at 80° C. for one half hour, rinsed and dried, then heated in pure hydrogen using the cycle 1° C./min to 730° C., hold 5 hours. After cooling in the furnace, the wafers are immersed in fuming sulfuric acid (which has been pre-heated to about 90° C. to prevent the surface tension of the acid from fracturing the foam), and the vessel is heated to 125° C. for 24 hours under an argon atmosphere. The sulfuric acid is drained, and the wet wafers are allowed to stand in air overnight. Excess sulfuric acid is then drained away, and the wafers are immersed in an ice/water mixture to rinse away the sulfuric acid. The final density of the carbon is 0.75 g/cm$^3$. The electrical conductivity (measured with a four-point probe) is 20 S/cm. The surface area, as measured by the BET method, is 750 m$^2$/g.

EXAMPLE 2

This example illustrates how the sulfonation process disclosed herein may be applied to other forms of carbon besides porous monolithic blocks or wafers. In this example a powdered carbon is sulfonated to improve its supercapacitor performance. Four grams of high surface area carbon powder is heated in nitric acid at 80° C. for one half hour. The sample is then filtered, rinsed with water, and then leached in distilled water overnight. The next day it is filtered and air-dried, loosely dispersed in a carbon boat, and heated in pure hydrogen using the cycle 1° C./min to 730° C., hold five hours. After cooling in the furnace, the powder is transferred into a dry vessel, fuming sulfuric acid added, and the mixture heated to 115° C. for 24 hours under an argon atmosphere. After cooling, the mixture is filtered to separate the carbon, which is allowed to stand in air overnight. Because the carbon powder is moist with hygroscopic sulfuric acid, it absorbs a good deal of water as it stands overnight. The next morning it is suctioned further to remove this liquid, and then an ice/water mixture is added with stirring. After filtering the icewater away, the carbon powder is leached overnight in distilled water to remove traces of acid. It is then filtered and dried in air.

In order to demonstrate that the method of the present invention will produce carbon electrodes suitable for use in supercapacitors, electrochemical charge and discharge measurements were performed in sulfuric acid electrolyte. FIG. 1 illustrates the results of measurements made on two carbon electrodes prepared by the method of EXAMPLE 1 of this disclosure. The total discharge capacitance (double layer plus charge transfer) is above 240 F/g at low rates of charge/discharge (1–25 mA/cm$^2$), and remains above 200 F/g at a high rate of discharge (300 mA/cm$^2$).

Figure 2:
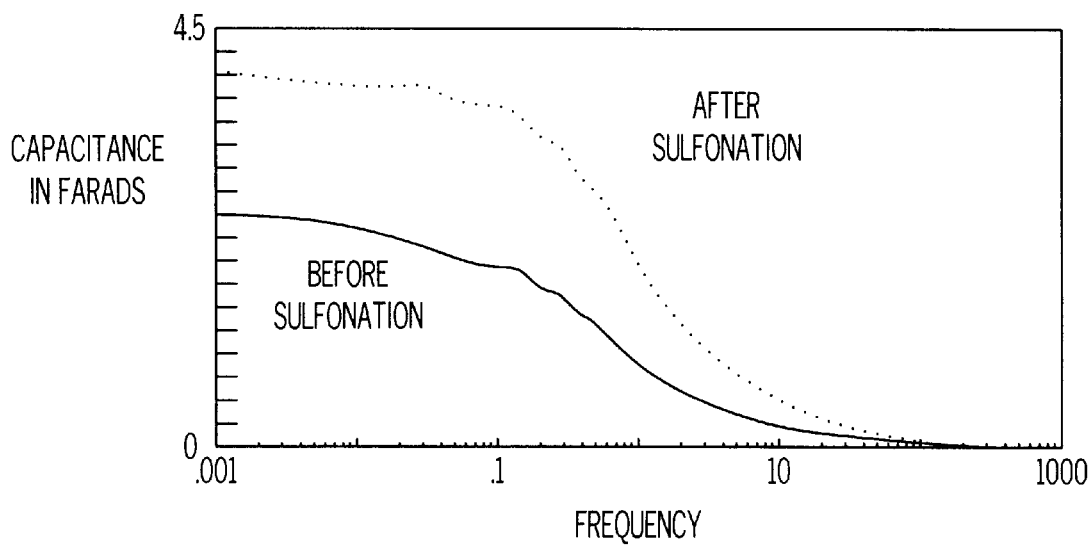
FIG. 2 is a graph of capacitance as a function of frequency for a carbon powder before and after sulfonation in accordance with the invention.
Figure 3:
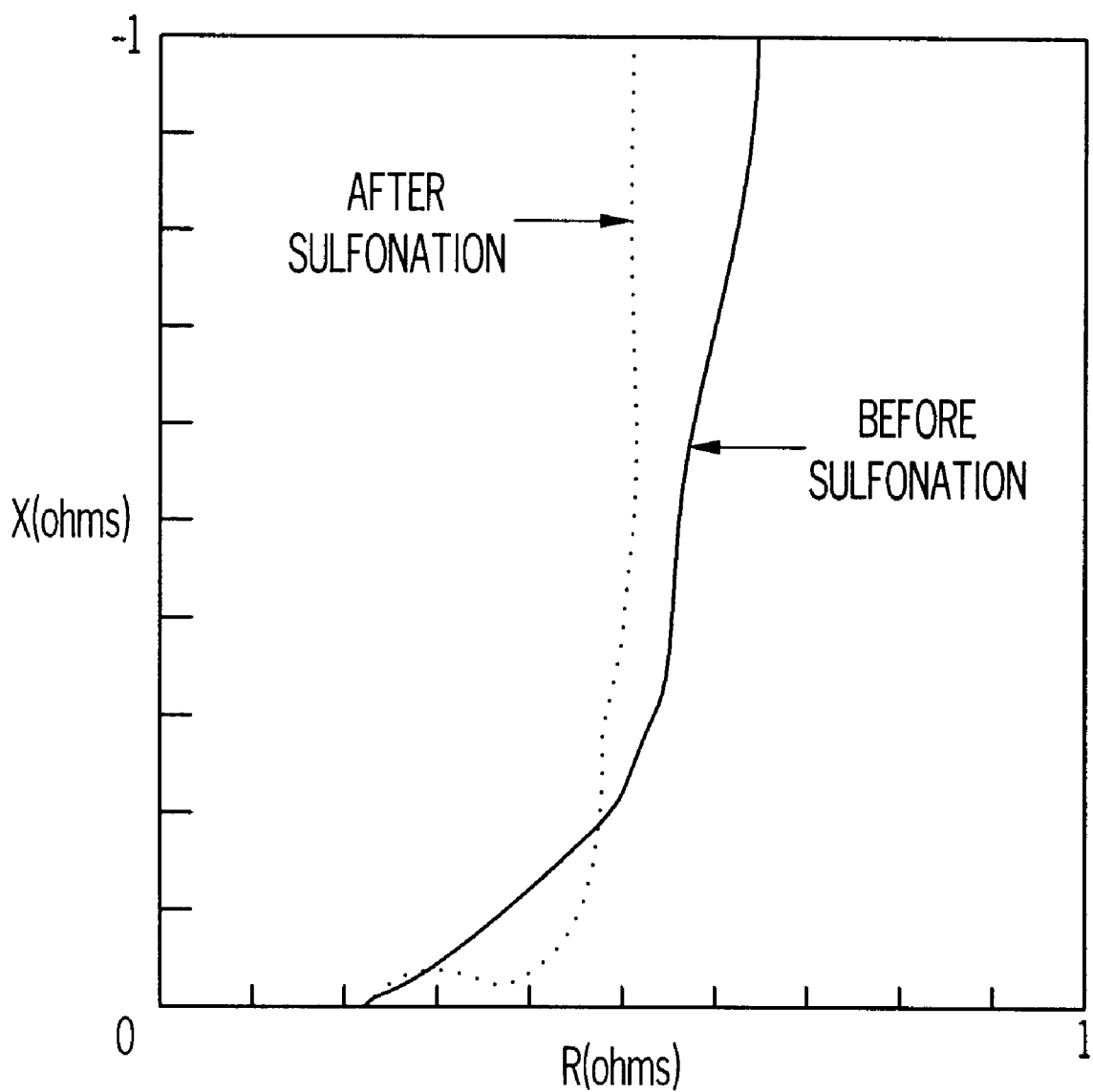
FIG. 3 is a graph (nyquist plot) of impedance of a carbon powder before and after sulfonation.

To further demonstrate that the method of the present invention will produce carbon suitable for use in supercapacitors, FIGS. 2 and 3 show the performance results for a powdered carbon before and after the sulfonation procedure described in EXAMPLE 2. This data was collected with the Electrochemical Impedance technique; each sample was tested as pressed loose carbon powder in sulfuric acid electrolyte.

I claim:

1. A carbon electrode formed from a carbon, which carbon is prepared by a process comprising the step of hydrogenating the carbon followed by the step of sulfonating the carbon.

2. The carbon electrode of claim 1 wherein the sulfonating step is carried out by heating said carbon in fuming sulfuric acid, concentrated sulfuric acid, $SO_3$, or chlorosulfonic acid.

3. A carbon electrode formed from a carbon which is prepared by a process comprising the steps of:

forming a layer of phenolic resin powder;

melting said phenolic resin powder under such conditions that the particles of said powder stick to themselves to form a porous network;

carbonizing said porous network to form a carbonized network; and sulfonating said carbonized network.

4. The carbon electrode of claim 3 wherein the sulfonating step is carried out by heating said carbonized network in fuming sulfuric acid, concentrated sulfuric acid, $SO_3$, or chlorosulfonic acid.

5. The carbon electrode of claim 3 further comprising a hydrogenating step prior to the sulfonating step wherein said carbonized network is hydrogenated.

6. The carbon electrode of claim 3 wherein the carbonizing step is carried out in the presence of hydrogen.

7. The carbon electrode of claim 4 wherein the sulfonating step is carried out by heating said carbonized network in fuming sulfuric acid.

8. The carbon electrode of claim 5 wherein said hydrogenating step is carried out by heating said carbonized network in a hydrogen-containing atmosphere at a temperature greater than 650° C.

9. The carbon electrode of claim 8 further comprising an oxidizing step immediately prior to said hydrogenating step wherein said carbonized network is treated with nitric acid.

10. The carbon electrode of claim 9 wherein the melting step further includes increasing the temperature at a rate of approximately 0.1 to 4° C. per minute to a temperature approximately between 80 and 160° C.

11. The carbon electrode of claim 10 wherein the step of forming the layer further includes step of forming a layer less than 0.01 inches thick.

12. A carbon electrode formed from a carbon which is prepared by a process comprising the steps of:

forming a layer of phenolic resin powder and carbon powder;

melting said phenolic resin powder under such conditions that the particles of said powder stick to themselves and to the carbon particles of said carbon powder to form a porous network;

carbonizing said porous network to form a carbonized network; and sulfonating said carbonized network.

13. The carbon electrode of claim 12 wherein the sulfonating step is carried out by heating said carbonized network in fuming sulfuric acid, concentrated sulfuric acid, $SO_3$, or chlorosulfonic acid.

14. The carbon electrode of claim 12 further comprising a hydrogenating step prior to the sulfonating step wherein said carbonized network is hydrogenated.

15. The carbon electrode of claim 14 wherein said hydrogenating step is carried out by heating said carbonized network in a hydrogen-containing atmosphere at a temperature greater than 650° C.

16. The carbon electrode of claim 15 further comprising an oxidizing step immediately prior to said hydrogenating step wherein said carbonized network is treated with nitric acid.

17. The carbon electrode of claim 16 wherein the melting step further includes increasing the temperature at a rate of approximately 0.1 to 4° C. per minute to a temperature approximately between 80 and 160° C.

18. The carbon electrode of claim 17 wherein the step of forming the layer includes step of forming a layer less than 0.01 inches thick.

19. The carbon electrode of claim 13 wherein the sulfonating step is carried out by heating said carbonized network in fuming sulfuric acid.

20. The carbon electrode of claim 12 wherein the carbonizing step is carried out in the presence of hydrogen.

* * * * *